United States Patent Office 3,134,796
Patented May 26, 1964

3,134,796
CHROMIUM AND TIN TETRAALKYLBORON COMPOUNDS AND PREPARATION THEREOF
Paul Kobetz, Baton Rouge, La., assignor to Ethyl Corporation, New York, N.Y., a corporation of Virginia
No Drawing. Filed July 11, 1960, Ser. No. 41,785
9 Claims. (Cl. 260—429.7)

This application is a continuation-in-part of application Serial No. 831,081 filed August 3, 1959 and now abandoned.

The present invention is concerned with a process for the manufacture of organometallic complexes and certain novel organometallic complexes.

Certain bimetallic organometallic compounds are known to the art. For example, sodium tetraphenylboron has been known and is available as a commercial product. Additionally, compounds such as sodium or lithium tetraethylaluminum are known although not presently commercially available. These compounds have been prepared, generally, in either of two ways. One method comprises adding an organometallic compound of lithium or sodium to an organometallic compound of aluminum or boron. Another procedure which has been disclosed for forming the bimetallic compounds in which aluminum is one of the metals is to olefinate a metal alkyl aluminum hydride. For example, it is known that lithium triethylaluminum hydride can be reacted with ethylene to produce lithium tetraethylaluminum. Under certain conditions, particularly the presence of a catalyst, lithium aluminum tetrahydride can also be reacted with certain olefins to produce the corresponding lithium tetraalkyl aluminum compounds. It is also known that sodium tetraethylaluminum can be obtained by reacting sodium metal with triethylaluminum.

The above typifies the present state of knowledge of the bimetallic organometallic compounds reflecting that the bimetallic compounds in which one metal is, for example, a transition series metal or tin and especially those wherein the other metal-like element is boron have not been known nor have methods for their preparation been known. Such compounds which possess unique properties, as discussed in more detail hereinafter, have now been prepared by a novel process.

Therefore, an object of this invention is to provide novel metal organoboron complex compounds, particularly of chromium and tin. A further object is to provide a novel process for the production of the aforementioned metal organoboron complex compounds. Another object is to provide novel metal organoboron complex compounds by a new process in high yield and purity. These and other objects will be apparent as the discussion proceeds.

In general, the novel products of this invention comprise metal organoboron complex compounds in which the metal is chromium or tin; and the residual valences of the boron are satisfied by alkyl groups. The metal organoboron complex compounds wherein the metal is tin or chromium, and only hydrocarbon alkyl groups, preferably having up to and including about 8 carbon atoms, are bonded to boron are particularly preferred and unique metal organoboron complex compounds forming a part of the present invention.

The novel products briefly described above and other metal organoboron complex compounds are produced by a new process which comprises reacting a salt or oxide of chromium, or tin, with a metal organoboron complex compound wherein the metal is an alkali or alkaline earth metal different from the aforementioned group II-A element, and the boron has four alkyl groups attached thereto. The preferred salts and oxides are the organic acid salts of alkanoic acids having up to about 8 carbon atoms, and the halides, especially the chlorides, of the metals tin and chromium. The preferred metal organoboron reactants are those wherein the metal is sodium, and four lower alkyl radicals, having up to and including about 8 carbon atoms are attached to the boron. Other embodiments of the invention will be evident as the discussion proceeds.

Thus, the present invention provides novel products having considerable use which have not been available heretofore. The invention also provides a novel process for the production of such novel products and other metal organoboron compounds in high yield and purity. A particular advantage of the present invention is that novel organometallic compounds of the transition series metals described herein along with a method for their preparation is provided resulting in compounds containing the designated transition series metal and alkyl radicals which have not been obtainable or known to exist heretofore in any other form. By way of illustration of this advantage, heretofore transition series metal alkyls, e.g. chromium triethyl, have been non-existent whereas the novel products of this invention product such transition series metal compounds which contain alkyl groups. Further, the process of this invention is different from the prior art processes employed for making the previously known bimetallic organometallic compounds such as sodium tetraethylaluminum and is unique in that complex metal organoboron compounds result with the designated salt and oxide reactants whereas with certain other metal salts simple organometallic, i.e. not bimetallic, compounds form. Other advantages will be evident as the discussion proceeds.

As briefly described above, the novel products of this invention comprise metal organoboron compounds wherein the metal is chromium or tin; and the boron has attached thereto four alkyl groups. Thus, the novel products can be depicted by the following formula:

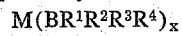
$$M(BR^1R^2R^3R^4)_x$$

M being chromium or tin; the R groups being the alkyl groups; and $x$ equaling the valence of M.

Typical examples of the novel products of this invention comprise: tin tetramethylboron, chromium tetraethylboron, chromium tetraisopropylboron, chromium tetraeicosylboron, tin tetrabutylboron, chromium ethyltributylboron, chromium ethyltriisopropylboron, tin diethyldiisopropylboron, chromium octyltrioctadecylboron and the like. It is preferable that all of the chemical groups attached to the boron be alkyl radicals having up to and including about 8 carbon aotms. Such compounds of the metals tin and chromium comprise an especially unique group of compounds of high stability and effective use. Thus, especially preferred embodiments comprise tin and chromium tetraalkylboron, especially the tin and chromium tetraethylborons.

As indicated above, the novel process of this invention applicable to the preparation of the above novel compounds and other metal organoboron complex compounds comprises reacting a metal salt, including organic and inorganic acid salts, or a metal oxide wherein the metal is chromium or tin, with a metal organoboron complex compound wherein the metal is an alkali or alkaline earth metal, different from the metal of the aforementioned salt or oxide reactant, and boron has attached thereto only alkyl radicals. The preferred metal salt reactants are the organic salts, particularly of the lower alkanoic acids, and halides, especially chlorides, of tin and chromium. Of the metal organoboron reactant compounds, those wherein the metal is an alkali metal are preferred, especially sodium. Thus, the process of this invention can be depicted by the following equation:

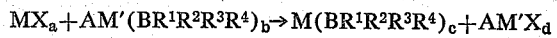
$$MX_a + AM'(BR^1R^2R^3R^4)_b \rightarrow M(BR^1R^2R^3R^4)_c + AM'X_d$$

M being tin, or chromium; M' being an alkali or alkaline earth metal; X being an anion as described above or oxygen; the R's being alkyl groups as described hereinbefore with relation to the novel products of this invention; A equaling the ratio of the valence of M to M'; "a" equaling the valence of M or the ratio of the valences of M to X; "b" equaling the valence of M'; "c" equaling the valence of M; and "d" equaling the valence of M' or the ratio of the valence of M' to X.

Thus, in general, the salts and oxides of the metal, M, are reacted with the metal organoboron compound. The salts include those of both inorganic and organic acids. While organic acids generally are considered as having a carboxylic acid grouping, it is to be understood that organic compounds not having such groupings, but having strongly acidic hydrogen which form salts with the metals, M, are equally applicable as, for example, the alcohols and phenols. Thus, among the salt reactants included are the sulfides, chlorides, bromides, iodides, and fluorides of, for example, tin and chromium. Other salts of inorganic acids are those which can be termed as salts of complex inorganic acids containing a chalkogen, namely oxygen or sulfur. By the term complex inorganic acid is intended those inorganic acids which contain at least one of the elements oxygen or sulfur in the anion and additionally contain therein another and different element of the groups III through VI of the Periodic Chart of the Elements capable of forming complex ions with oxygen or sulfur. The non-metallic elements capable of forming complex ions with oxygen or sulfur of the groups III-A, IV-A, V-A, and VI-A, are particularly preferred. Such include boron, carbon, nitrogen, silicon, phosphorous, arsenic, selenium, and tellurium. Included among the preferred anions of the complex inorganic acids are those wherein both oxygen and sulfur comprise the anion, e.g. the sulfate anion. Thus, typical examples of such salts include the tin and chromium sulfates, sulfonates, sulfinates, carbonates, nitrates, phosphates (both ortho and meta), pyrophosphates, persulfates, silicates, cyanates, thiocyanates, dithionates, borates (both ortho and meta), selenates, the various arsenates, and the like. Other salts which can be employed but are less preferable include, for example, those in which the anion comprises, in addition to the oxygen or sulfur, certain metals such as those of groups III-B through VI-B and III-A through V-A, for example, tin, or chromium antimonate, tungstate, chromate, zirconate, molybdate, and the like.

Typical examples of the oxides employable in the process include tin oxide, chromium oxide, and the like.

The salts of the organic acids can be further defined as such wherein the metal is attached to at least one carbon-containing organic radical through an intermediate atom of oxygen or sulfur. For practical reasons, the hydrocarbon portions of such salts will generally contain not more than about 25 carbon atoms, even though higher molecular weight materials can be employed. Illustrative examples of the salts of organic acids include chromium formate, tin acetate, tin butanoate, tin octanoate, chromium myristate, chromium ethylate, tin propiolate, and the like. It is to be understood that the hydrocarbon portions of such organic acid salts can be further substituted to result in branched chain isomers or substituted with functional groups provided such are essentially inert in the reaction. The chromium and tin salts of the lower alkanoic acids having up to about 8 carbon atoms in the hydrocarbon portions, are preferred salts of organic acids because of their greater availability, economy, solubility in the reaction system, and higher yields obtained.

Typical examples of the metal organoboron reactant include the following: sodium tetramethylboron, sodium tetraethylboron, sodium tetraisopropylboron, sodium tetraoctylboron, sodium tetraoctadecylboron, sodium tetraeicosylboron, sodium ethyltrimethylboron, sodium tetraisobutylboron, sodium tetra(3-methylbutyl)-boron, sodium tetra(4-methylpentyl)boron, sodium ethyltributyl- boron, sodium ethyltrioctylboron, sodium ethyltriocta- decylboron, sodium ethyltriisopropylboron, sodium diethyldiisopropylboron, sodium diethyldiocetadecylboron, sodium octyltrioctadecylboron; lithium tetraethylboron, magnesium tetraethylboron, calcium tetraethylboron, strontium tetraethylboron, potassium ethyltripropylboron, and the like. It is to be understood that the alkyl portions of the above and other metal organoboron complex compounds can be further substituted with other functional groups which do not interfere with the reaction as, for example, the halogens, acid groups, both inorganic and organic, and the like. It is preferable that the R groups of the metal organoboron complex reactant be the lower alkyl groups having up to and including about 8 carbon atoms since these are quite suitable in the process and result in more stable and useful products.

The proportions of reactants can be varied. For example, an excess of either reactant can be employed. However, best results are obtained when essentially stoichiometric amounts of the reactants are employed which thereby results in easier separation and recovery of the desired product. This, the reactants are employed in essentially the inverse ratio of the valence of the metal of the metal salt or oxide reactant to the valence of the alkali or alkaline earth metal of the metal organoboron reactant.

While a solvent is not essential in conducting the process, such can be employed to advantage when the reactants are solids and particularly when the product and by-product would ordinarily be a solid under the reaction conditions. For this purpose, various solvents are available including the organic solvents such as the hydrocarbons, ethers, and amines, especially tertiary amines. While the solvents should be essentially inert in the system, they can form complexes with the reactants since such complexes will not hinder the principal reaction. Likewise, they should be liquid under the reaction conditions. Typical examples of suitable solvents are ethers, such as dimethyl ether, diethyl ether, methylethyl ether, methylisopropyl ether, methyl-n-propyl ether, and mixtures thereof. Suitable polyethers are ethylene and diethylene glycol diethers, such as the dimethyl, methylethyl, diethyl, methylbutyl, ethylbutyl, dibutyl, and butyllauryl ethers of ethylene and diethylene glycol; trimethylene glycol ethers, such as dimethyl, diethyl, methylethyl, etc.; glycerol ethers, such as trimethyl, dimethylethyl, diethylmethyl, etc.; and cyclic ethers, such as dioxane, and terahydrofuran. Typical amines suitable for this invention include aliphatic and aromatic amines and heterocyclic nitrogen compounds. The preferred amines are tertiary amines such as trimethylamine, dimethylethylamine, triethylamine, dimethyl aniline, pyridine, tetraethylethylenediamine, N-methylmorpholine, and the like. Primary and secondary amines can also be used such as methylamine, dimethylamine, acetonitrile, and the like. Other suitable solvents include hydrocarbons such as the aromatics as toluene, xylene, etc.; cyclic compounds such as cyclohexane, etc.; aliphatic hydrocarbons, such as hexanes, octanes, nonanes, and the like.

The solvents which are particularly preferred are tetrahydrofuran, and the lower alkyl ethers of the polyethers, in which the alkyl groups have up to about 4 carbon atoms, particularly such ethers of ethylene glycol and diethylene glycol. Of the polyethers, the dimethyl ether of diethylene glycol and dimethoxyethane comprise an especially preferred embodiment. The proportions of the solvent can be varied over a wide range as between about 1 to 100 parts per part by weight of the metal organoboron reactant, but is generally employed in amount to provide a fluid reaction system.

The reaction proceeds quite readily over a wide range of temperatures as between about 0° C. to the decomposition temperature of the reactants or products. It is preferable in order to avoid unnecessary decomposition or side reactions to conduct the reaction at a temperature between about 20 and 175° C. When a solvent is employed in the system, it is quite advantageous to employ the reflux temperature of the mixture. There is no need to employ any pressure other than atmospheric in conducting the reaction, although pressure can be employed if it is desirable to operate above the boiling point of any of the constituents of the reaction mixture.

Because of the reactivity of certain of the reactants and the products to the atmosphere, it is desirable to conduct all operations in the presence of an inert atmosphere. Suitable atmospheres include nitrogen, argon, neon, krypton, and the like inert gases. Generally, it is preferred that the reaction system be kept essentially anhydrous to avoid side reactions.

The reaction is ordinarily conducted until complete which usually occurs within a period of about 10 hours. In most instances, complete reaction is obtained within about ½ to 1 hour and these reaction times are preferred.

The product is readily separable from the reaction system. In general, the by-product salt which is formed is usually insoluble in the system whether or not a solvent is employed, and is filtered therefrom leaving the product in essentially pure form or dissolved in the solvent employed. In those instances wherein a homogeneous liquid reaction system results or when it is desirable to separate the product from a solvent which is employed, separation can be effected by the usual physical operations, such as extraction, fractional distillation, or fractional crystallization.

The novel products and the novel process of this invention are further demonstrated by the following examples wherein all parts are by weight unless otherwise specified.

Example I

To a reactor equipped with external heating means, internal agitation and with a continuous atmosphere of nitrogen was added 3.2 parts of sodium tetraethylboron in 50 parts of dimethoxyethane. The resulting mixture was agitated and then 2 parts of anhydrous stannous chloride were added thereto. An immediate reaction took place resulting in an orange-red solution and formation of a precipitate. The mixture was heated at reflux temperature for 2 hours even though the reaction was instantaneous. The solution was filtered to remove the by-product sodium chloride. The filtrate was distilled at reduced pressure to remove the majority of dimethoxyethane solvent. Then about 50 parts of petroleum ether was added to the residue and 1.5 parts of yellow surface solids separated. The mixture was filtered and the solids dried. A yield of 39 percent of the solids was obtained. Analysis showed the product to be tin tetraethylboron, $Sn(BEt_4)_2$, contaminated with some stannous chloride. Further purification is obtained by extraction with dimethoxyethane and recrystallization with petroleum ether. The product was insoluble in toluene.

Example II

Employing the procedure of Example I, 1.8 parts of chromic chloride were reacted with 5 parts of sodium tetraethylboron in 80 parts of dimethoxyethane. The reaction took place at room temperature immediately upon the addition of the chromic chloride to the sodium tetraethylboron solution. The resulting mixture was filtered and analyzed. Analysis showed 1.55 parts chromium to 1 part of boron, whereas chromium tetraethylboron, $Cr(BEt_4)_3$, contains a ratio of 1.6 parts chromium to 1 part boron.

Similar results are obtained when the other metal salts or oxides are substituted in the above examples for reaction with other metal organoboron complex reactants as well as substituting other solvents and conditions as set forth previously. The following examples will illustrate additional embodiments of the present invention.

Example III

Stannous tetraethylboron is obtained in high yield when stannous oxide is reacted with sodium tetraethylboron in the presence of the dimethyl ether of diethylene glycol at 175° C. for 1 hour.

Similar results are obtained to form the corresponding novel metal organoboron compounds when chromium oxide is substituted in the above example.

Example IV

Stannous tetraoctylboron is produced in high yield when essentially 1 mole of stannous sulfate is reacted with 2 moles of potassium tetraoctylboron in the presence of the dimethyl ether of diethylene glycol at 125° C. for 2 hours.

The corresponding compound of chromium is obtained when chromium sulfate is substituted in the above example in equivalent amounts.

Example V

When chromium iodide is reacted with calcium tetraethylboron in the dimethyl ether of diethylene glycol at 100° C. for 2 hours, chromium tetraethylboron is produced.

When this example is repeated substituting magnesium tetraethylboron, strontium tetraisopropylboron and the like, the corresponding chromium compounds are produced.

Example VI

The procedure of Example I is repeated employing 3 parts of stannous chloride and 8.1 parts of sodium tetraisobutylboron in the presence of 80 parts of dimethoxyethane at the reflux temperature for 1 hour. The by-product sodium chloride is filtered and the remaining solution is distilled under vacuum to remove the ether. Tin tetraisobutylboron is obtained.

The above examples are presented by way of illustration and the novel products and process are not intended to be limited thereby. Any of the salts or oxides, the metal organoboron complex reactants, solvents and conditions described hereinbefore, can be substituted in the above and other examples to produce similar results and illustrate other examples of the novel products of this invention.

The novel products are described previously are stable compounds, the majority being solid at standard conditions. The physical characteristics will vary depending upon the metals involved, and the chain length of the alkyl groups. The compounds are also of varying colors with some of them being colorless for the same reasons. In general, they are all soluble or complex with the typical organic solvents, such as the ethers, and tertiary amines as described hereinbefore. An outstanding feature of some of the compounds of the present invention is that they are, by comparison to the previously known organometallic compounds, more stable to water.

The novel products are of considerable utility. They can be employed, for example, as chemical intermediates to form other organometallic compounds. A typical example of this utility is the reaction of stannous tetraethylboron with lead chloride to produce tetraethyllead. Certain of the novel compounds are excellent as homogenous catalyst systems for hydrogenation or polymerization reactions. Since, in general, all the compounds are soluble in the coordinating organic solvents, they can be dissolved to form the homogeneous catalytic systems for such reactions. For example, chromium tetraethylboron dissolved in the dimethyl ether of diethylene glycol forms a homogeneous catalytic system for hydrogenating olefinic materials, such as fatty acids or hydrocarbons, such as butadiene. Chromium tetraethylboron when dissolved in organic solvents such as the ethers or tertiary amines is well suited for catalysts for the polymerization of olefins, such as ethylene. For example, when about 1 percent by weight of chromium tetraethylboron dissolved in dimethoxyethane is employed as a catalyst for polymerizing ethylene at 1000 p.s.i. and 100° C., solid polyethylene of high molecular weight is produced. The novel products are also quite useful in forming plates upon other metals. The products wherein the primary metal is the transition series element or tin are quite well suited for this purpose. For example, when chromium tetraethylboron is coated upon an iron surface, heated above the decomposition temperature of the complex compound, chromium is deposited upon the surface of the iron. Similarly, when tin tetraethylboron is contacted with a hot plate of steel, tin forms on the exposed surfaces. Other uses of the novel products of this invention will be evident to those skilled in the art.

Having thus described the novel process of this invention and the novel products, it is not intended that it be limited except as set forth in the following claims.

I claim:

1. Metal alkyl boron complex compounds having the formula $$M(BR^1R^2R^3R^4)_x$$

wherein M is a metal selected from the group consisting of chromium and tin; each of $R^1$, $R^2$, $R^3$ and $R^4$ is an alkyl group having from 1 to 20 carbon atoms; and $x$ is an integer equal to the valence of M.

2. The composition of claim 1 wherein said alkyl groups each have up to and including about 8 carbon atoms.

3. Chromium tetraethylboron.

4. The process for producing metal alkyl boron complex compounds as defined in claim 1 which comprises reacting under essentially anhydrous conditions (1) a compound selected from the group consisting of salts and oxides of metals selected from the group consisting of chromium and tin with (2) a metal alkyl boron complex compound wherein the metal is selected from the group consisting of alkali and alkaline earth metals; said alkyl groups of the metal alkyl boron complex compound each having from 1 to 20 carbon atoms.

5. The process for producing metal alkyl boron complex compounds as defined in claim 1 which comprises reacting under essentially anhydrous conditions (1) a halide of a metal selected from the group consisting of chromium and tin with (2) a metal alkyl boron complex compound wherein the metal of said compound is an alkali metal and the alkyl groups of said compound each contain up to and including 8 carbon atoms.

6. The process of claim 5 wherein the reaction is conducted in the presence of an organic solvent at a temperature between about 20° to 175° C.

7. The process for producing chromium tetraethylboron which comprises reacting under essentially anhydrous conditions chromium chloride and sodium tetraethyl boron at a temperature of between about 20° to 175° C. in the presence of about 1 to 100 parts by weight of dimethoxy ethane based on the weight of the sodium tetraethylboron.

8. The process of producing tin tetraethylboron which comprises reacting under essentially anhydrous conditions tin chloride with sodium tetraethylboron at a temperature of between 20° and 175° C. in the presence of about 1 to 100 parts by weight of dimethoxy ethane based on the weight of the sodium tetraethylboron.

9. Tin tetraethylboron.

References Cited in the file of this patent

UNITED STATES PATENTS

| | | |
|---|---|---|
| 2,950,302 | Riddle | Aug. 23, 1960 |
| 2,969,381 | Blitzer et al. | Jan. 24, 1961 |

FOREIGN PATENTS

| | | |
|---|---|---|
| 543,913 | Belgium | June 23, 1956 |

OTHER REFERENCES

Wittig, G.: "J. Liebigs Annalen der Chemie," 573 (1951), pages 195–209.